US008948057B2

(12) United States Patent
Ku et al.

(10) Patent No.: US 8,948,057 B2
(45) Date of Patent: Feb. 3, 2015

(54) SECURING UNIFORM RESOURCE IDENTIFIER INFORMATION FOR MULTIMEDIA CALLS

(75) Inventors: Bernard Ku, Austin, TX (US); Armstrong Soo, San Ramon, CA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 1055 days.

(21) Appl. No.: 12/638,388

(22) Filed: Dec. 15, 2009

(65) Prior Publication Data

US 2011/0142035 A1   Jun. 16, 2011

(51) Int. Cl.
*H04L 12/16* (2006.01)
*H04L 12/66* (2006.01)
(Continued)

(52) U.S. Cl.
CPC .......... *H04L 63/0853* (2013.01); *H04W 12/06* (2013.01); *H04L 63/102* (2013.01);
(Continued)

(58) Field of Classification Search
CPC . H04L 63/102; H04L 63/205; H04L 63/0853; H04L 63/164; H04L 65/24; H04L 65/1069; G04F 17/3051; G04F 17/30876; H04W 12/06; H04W 28/0247; H04W 80/10
USPC .................. 370/260, 352–356; 713/153, 154; 726/3, 4
See application file for complete search history.

(56) References Cited

U.S. PATENT DOCUMENTS 6,968,050 B1   11/2005  Pershan et al.
7,069,432 B1*  6/2006   Tighe et al. .................... 713/151
(Continued)

FOREIGN PATENT DOCUMENTS

WO   WO 2009/068111 A1   6/2009

OTHER PUBLICATIONS

"Privacy and Security Considerations in ENUM," Shockey et al., IETF ENUM Working Group, Center for Democracy and Technology, Internet Draft, Jul. 2003, http://www.ietf.org/ietf/1id-abstracts.txt.
(Continued)

*Primary Examiner* — Asad Nawaz
*Assistant Examiner* — Kai Chang
(74) *Attorney, Agent, or Firm* — Akerman LLP; Michael K. Dixon; Roy P. Zachariah

(57) ABSTRACT

A session request from a first subscriber is received at a first network component of a packet-based network. The session request comprises a request to establish a communications session between the first subscriber and a second subscriber. In the event the session request originated in a trusted network, the first network component permits access to unique resource identifier (URI) information associated with the second subscriber for use in establishing the communications session via the packet-based network. In the event the session request did not originate in a trusted network and in response to determining a security configuration associated with the second subscriber allows the first subscriber to access the URI information under the circumstances, the first network component permits access to the URI information for use in establishing the communications session via the packet-based network. In response to determining the security configuration prohibits access to the URI information by the first subscriber under the circumstances, the first network component forwards the session request to a second network component so as to establish the communications session via a public switched telephone network.

17 Claims, 6 Drawing Sheets

(51) Int. Cl.
  *G06F 7/04* (2006.01)
  *G06F 15/16* (2006.01)
  *H04L 29/06* (2006.01)
  *H04W 12/06* (2009.01)
  *H04W 28/02* (2009.01)
  *G06F 17/30* (2006.01)
  *H04W 80/10* (2009.01)

(52) U.S. Cl.
  CPC ............ *H04L 63/205* (2013.01); *H04L 69/24* (2013.01); *H04W 28/0247* (2013.01); *G06F 17/3051* (2013.01); *G06F 17/30876* (2013.01); *H04L 63/164* (2013.01); *H04W 80/10* (2013.01); *H04L 65/1069* (2013.01)
  USPC .......... 370/260; 370/352; 370/353; 370/354; 370/355; 370/356; 726/3; 726/4

(56) References Cited

U.S. PATENT DOCUMENTS

| | | | | |
|---|---|---|---|---|
| 7,191,337 | B2 * | 3/2007 | Bartley | 713/182 |
| 7,260,207 | B2 | 8/2007 | Marsico | |
| 7,627,123 | B2 * | 12/2009 | Conway et al. | 380/270 |
| 7,843,948 | B2 * | 11/2010 | Bajko et al. | 370/401 |
| 8,082,580 | B1 * | 12/2011 | Desai et al. | 726/14 |
| 8,091,119 | B2 * | 1/2012 | Brown et al. | 726/4 |
| 8,179,804 | B2 * | 5/2012 | Boyle et al. | 370/241 |
| 8,301,660 | B2 * | 10/2012 | Yalamanchi | 707/783 |
| 2002/0145975 | A1 * | 10/2002 | MeLampy et al. | 370/235 |
| 2003/0016803 | A1 * | 1/2003 | Schmid et al. | 379/201.01 |
| 2006/0104263 | A1 * | 5/2006 | Krishnan et al. | 370/352 |
| 2008/0205396 | A1 * | 8/2008 | Dakshinamoorthy et al. | 370/390 |
| 2008/0282080 | A1 * | 11/2008 | Hyndman et al. | 713/150 |
| 2009/0249440 | A1 * | 10/2009 | Platt et al. | 726/1 |
| 2010/0154030 | A1 * | 6/2010 | Montemurro et al. | 726/1 |
| 2010/0232353 | A1 * | 9/2010 | Hu et al. | 370/328 |
| 2010/0250437 | A1 * | 9/2010 | Goeller et al. | 705/50 |

OTHER PUBLICATIONS

"An Overview of BEEP," Rose, Dover Beach Consulting, The Internet Protocol Journal, vol. 5, No. 2, Jun. 2002.
"ENUM—Mapping the E.164 Number Space into the DNS," Huston, Telstra, The Internet Protocol Journal, vol. 5, No. 2, Jun. 2002.
"One Byte at a Time—Bootstrapping with BOOTP and DHCP," Comer, Purdue University, The Internet Protocol Journal, vol. 5, No. 2, Jun. 2002.
"Privacy Issues in ENUM—A study for Industry Canada," tmdenton. com; Contract No. 5009207; Oct. 2003.

* cited by examiner

SECURING UNIFORM RESOURCE IDENTIFIER INFORMATION FOR MULTIMEDIA CALLS

FIELD OF THE DISCLOSURE

The present disclosure generally relates to communications networks, and more particularly relates to conducting multimedia communication sessions in communications networks.

BACKGROUND

The emergence of Voice-over-Internet Protocol (VoIP) and other data packet-based multimedia calling services has resulted in the co-existence of two different addressing schemes: the conventional telephone numbering scheme in accordance with the Internet Engineering Task Force (IETF) E.164 standard for user equipment on the public switched telephone network (PSTN); and the Internet Protocol (IP) addressing scheme in accordance with the IPv4 or IPv6 standards for user equipment on IP packet-based networks. Telephone number mapping processes often are used to unify these disparate addressing schemes, the most prominent of which is the International Telecommunication Union (ITU) Telephone Number Mapping (ENUM) specification. This specification makes use of domain name server (DNS)-type records to translate E.164 telephone numbers into a corresponding Uniform Resource Identifier (URI), which then may be used to identify a corresponding IP address for establishing a communications session, or multimedia call, between subscribers.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

Figure 1:
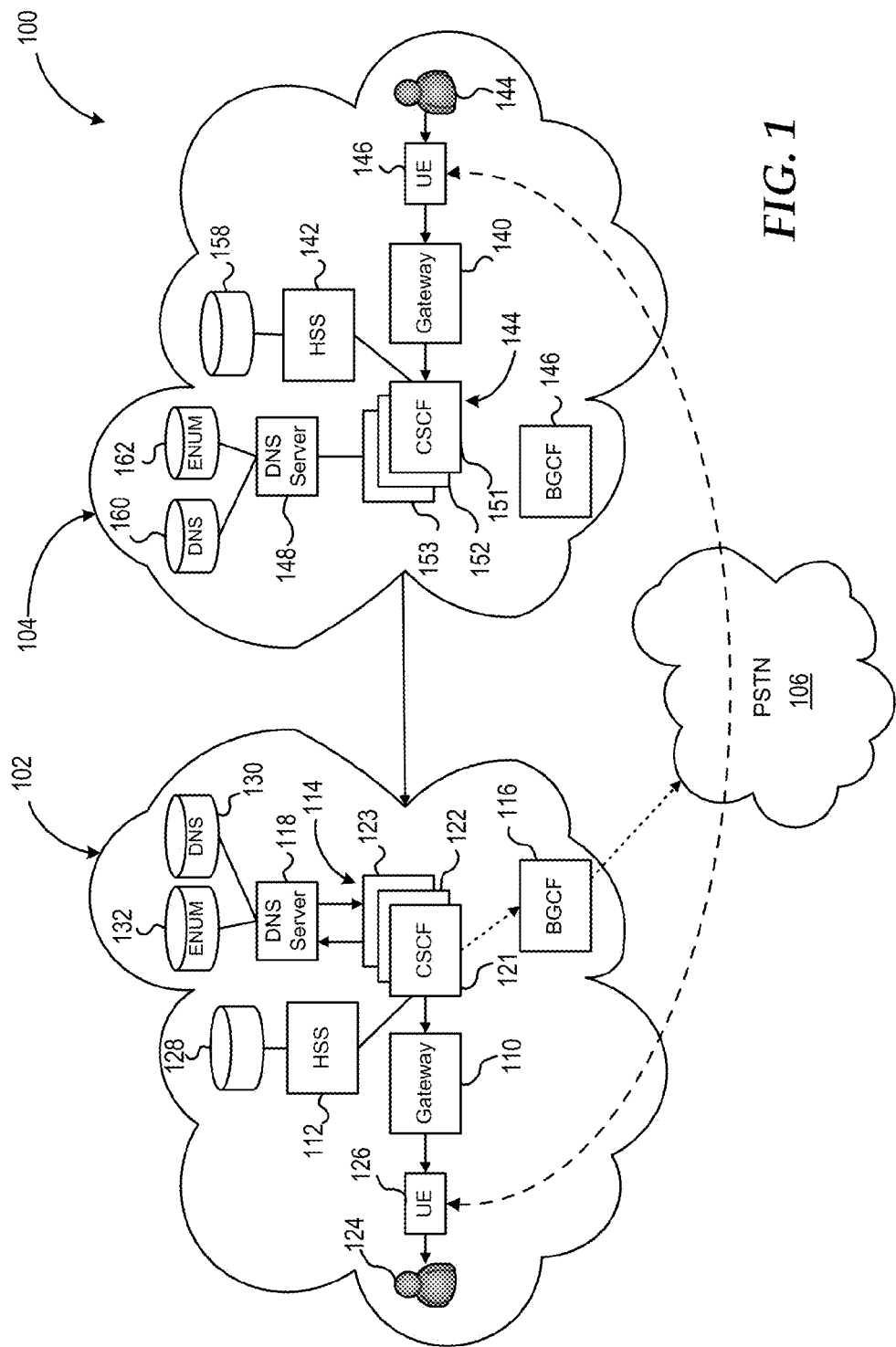
FIG. 1 is a diagram illustrating a communications system employing techniques for securing uniform resource identifier (URI) information from potentially malevolent actors in accordance with at least one embodiment of the present disclosure.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

FIGS. 1-6 illustrate techniques for securing subscribers' private information from malicious actors through manipulation of ENUM-assisted multimedia communications sessions in IP Multimedia Subsystem (IMS) networks. While the ENUM facility often provides a unified solution for converged multimedia services by making a variety of subscriber information available from one database, the flexible and reachable nature of conventional ENUM solutions gives rise to the risk of unscrupulous use of private subscriber information managed in the ENUM system. To illustrate, the ENUM facility often is abused to perpetrate identity theft or to build lists of URIs for use in propagating spam communications across a wide range of different communication services. To reduce or eliminate such abuses of the ENUM system, the present disclosure provides a technique for selectively permitting ENUM queries for multimedia communication session requests based on a security configuration set on behalf of the called subscriber. In one embodiment, a subscriber provides a registrar with security configuration parameters to be implemented as a security configuration in the callee's profile, whereby the security configuration details the circumstances in which access is permitted to the subscriber's URI information maintained in the ENUM system on behalf of the subscriber. In the event that a caller initiates a multimedia call to the subscriber (as the callee), various parameters regarding the caller are determined, including the originating network of the caller and an identifier associated with the caller. In the event that the caller's originating network is identified as a trusted network by the ENUM system, an ENUM query is permitted so as to obtain the callee's URI information for establishing a communications session over one or more packet-based networks in accordance with the VoIP standards or other multimedia call session standards. In one embodiment, the only trusted network is the network in which the callee is located.

In the event that the caller's originating network is not identified as a trusted network for ENUM purposes, the security configuration of the callee's profile is accessed to determine what restrictions the callee has placed on access to the callee's URI information. These restrictions can be caller-based so as to limit ENUM queries based on a comparison of the identifier of the caller to a predetermined list of acceptable callers, or alternatively, to a predetermined list of prohibited callers. Alternatively, the security limitations can be based on other factors, such as the time of day or the service type of the requested communications session (such as based on voice only, video-based, and the like). In the event that the caller's session request is consistent with the security configuration, the ENUM system permits an ENUM query to access URI information for the callee so as to facilitate establishment of the multimedia communications session between the caller and the callee via packet-based networks using the VoIP standards or other multimedia calling standards. The scope of the ENUM query may, however, be limited based on restrictions in the callee's security configuration. To illustrate, the callee may establish a list of potential callers that may be permitted to access only information associated with the callee's multimedia message service while denying access to IP address information associated with the callee's VoIP service. In the event that the circumstances of the caller's session request are inconsistent with the callee's security configuration, the ENUM system denies any ENUM queries on behalf of the session request and routes the session request to a Breakout Gateway Control Function (BGCF) component or other network component so as to establish the communications session via the PSTN in place of packet-based multimedia call solutions that rely on the ENUM facility. This process of selectively permitting ENUM queries based on a callee's security profile and based on parameters associated with the caller's facilitates ENUM-based IP communications while reducing or eliminating improper disclosure of the callees' URI information to potentially-malicious actors.

FIG. 1 illustrates an example communications system 100 implementing a secured ENUM facility in accordance with at least one embodiment of the present disclosure. The communications system 100 includes an IP network 102, an IP network 104, and a public switched telephone network (PSTN) 106. The IP networks 102 and 104 can include, for example, IP Multimedia Subsystem (IMS)-based networks for conducting multimedia communication sessions between various subscribers located within the communications system 100. These communications sessions can include any of a variety of communications services, such as mobile telephone calls, VoIP calls, video conferencing, multimedia messaging service, and the like.

In the illustrated example, the IP network 102 includes a gateway 110, a Home Subscriber Server (HSS) 112, a Call Session Control Function (CSCF) component 114, a Breakout Gateway Control Function (BGCF) component 116, and a Domain Name System (DNS) server 118. The CSCF component 114 can include multiple CSCF components, such as a proxy CSCF (P-CSCF) component 121, an interrogating CSCF (I-CSCF) component 122, and a serving CSCF (S-CSCF) component 123. The IP network 102 further includes one or more subscribers connected to the IP network 102 via the gateway 110 and user equipment associated with the subscriber, such as the subscriber 124 connected to the IP network 102 via user equipment (UE) 126. The user equipment can include, for example, a personal computer, a mobile telephone, a personal digital assistant, or the like.

The gateway 110 operates to facilitate communication between the user equipment of the subscribers, and the other components of the IP network 102 and components of other IP networks. The HSS 112 operates to store subscriber information in the form of subscriber profiles in a subscriber database 128 and to perform authentication and authorization of subscribers attempting to access the IP network 102. The subscriber information can include a unique identifier associated with the subscriber, the subscriber's location, and the IP address of the user equipment of the subscriber. The BGCF component 116 operates as an interface between the IP network 102 and the PSTN 106 so as to facilitate telephony sessions conducted at least partially via the PSTN. The DNS server 118 operates to conduct DNS queries to a DNS database 130 to translate supplied fully-qualified domain names (FQDNs) into corresponding IP addresses. Further, FIG. 1 illustrates an example implementation whereby the DNS server 118 also operates as an ENUM server by conducting ENUM queries to an ENUM database 132 to access subscriber uniform resource identifier (URI) information corresponding to supplied FQDNs. In an alternative embodiment, this ENUM facility can be provided via a separate ENUM server.

The P-CSCF component 121 serves as the firewall between the core components of the IP network 102 and the subscribers' user equipment. As such, the P-CSCF component 121 can authenticate subscribers and implement IP security (IPsec) associations with subscribers. The S-CSCF component 123 comprises a session initiation protocol (SIP) server configured to establish communication sessions between subscribers of the IP network 102, as well as with other subscribers in other IP networks. As such, the S-CSCF component 123 manages the routing of SIP messages to the appropriate application servers (not shown) of the IP network 102, obtains subscriber information via the HSS 112, manages routing services such as ENUM queries, and enforces the policies of the network operator. The I-CSCF component 122 operates as the interface between the CSCF component 114 and other networks. As such, the I-CSCF component 122 is used as the forwarding point for SIP traffic from other networks that is intended for a component within the IP network 102. The I-CSCF component 122 further can operate to route SIP messages for a particular subscriber to the corresponding S-CSCF component for the subscriber based on this subscriber information. In addition to these conventional functions, one or more of the P-CSCF component 121, the I-CSCF component 122, or the S-CSCF component 123 can implement the secured ENUM query process described in greater detail herein.

The IP network 104 can be configured in a manner similar to that illustrated for the IP network 102. Accordingly, the IP network 104 can include a gateway 140, an HSS 142 having access to a subscriber database 158, a CSCF component 144, a BGCF component 146 coupled to the PSTN 106, a DNS server 148 having access to a DNS database 160 and an ENUM database 162. The CSCF component 144 can include a P-CSCF component 151, an I-CSCF component 152, and an S-CSCF component 153. These components of the IP network 104 operate to provide multimedia services to one or more subscribers via the subscribers' user equipment, such as the user equipment 146 of a subscriber 144.

In a conventional operation to establish a multimedia call between the subscriber 144 (hereinafter, "the caller 144") and the subscriber 124 (hereinafter, "the callee 124"), the user equipment 146 of the caller 144 would submit a SIP INVITE request or other session request to the gateway 140, which would then forward the SIP INVITE request either to the CSCF component 144 in the event that the callee is on the same network as the caller or to the CSCF component 114 in the event that the callee is on a different network. For purposes of illustration, it is assumed in the following that the caller is on a different network and thus the SIP INVITE request is forwarded to the CSCF component 114 of the IP network 102. A similar operation would be performed with respect to the CSCF component 144 of the IP network 104 in the event that both the caller and callee were located in the IP network 104.

In a conventional approach, the CSCF component 114 would automatically initiate an ENUM query to the ENUM database 132 via the DNS server 118 to obtain the callee's URI information in response to the SIP INVITE request and then use this URI information to establish the requested communications session between the user equipment 146 of the caller 144 and the user equipment 126 of the callee 124 in accordance with, for example, the SIP protocol described in Request For Comment (RFC) 3261. However, this conventional approach risks undesirable access to the callee's private URI information in the event that the caller is a malevolent actor intending to use the callee's URI information for perpetrating identity theft or for building a list for spam email activities. Accordingly, to reduce or eliminate undesirable access to a callee's private URI information, the ENUM facility of the IP network 102 implements a filtering process of selectively permitting ENUM queries subject to a security configuration set by, or on behalf of, the callee 124. Should the circumstances of the session request comply with the security configuration set by the subscriber, an EMUM query is permitted so as to obtain the URI information needed to complete the communications session. However, the scope of the permitted ENUM query may be limited based on the security parameters. To illustrate, the security parameters may limit the ENUM query to only a particular URI type while prohibiting access to other URI types, such as by allowing access to the IP address of the user equipment of the callee while prohibiting access to email address information. In the event that the circumstances of the session request do not comply with the security configuration, the session request is forwarded to the BGCF component 116 so as to establish the communications session via the PSTN 106 rather than via the IP-based network paths between the IP network 102 and the IP network 104.

Figure 2:
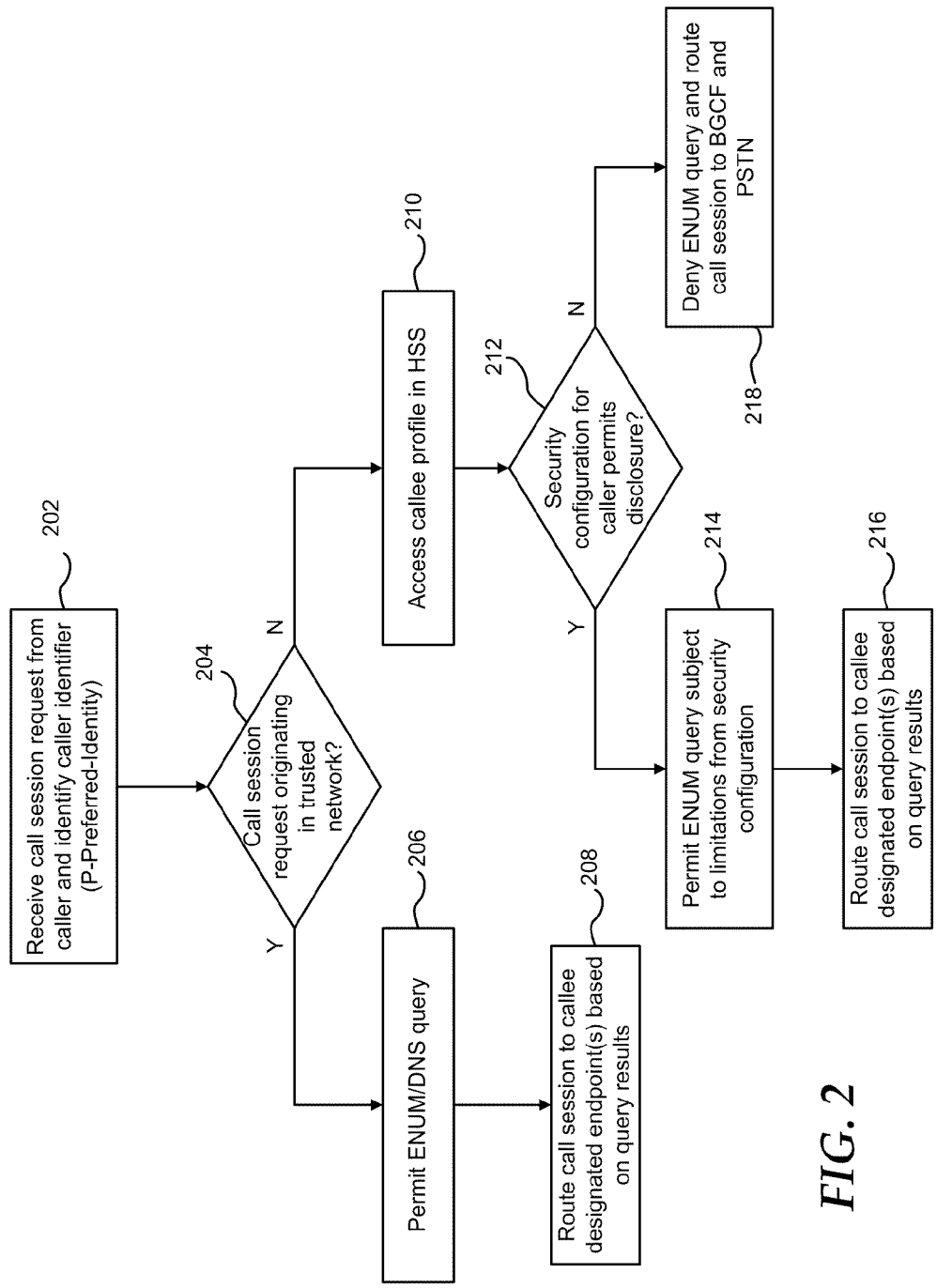
FIG. 2 is a flow diagram illustrating a method for selectively permitting queries in association with a session request in accordance with at least one embodiment of the present disclosure.

FIG. 2 depicts a flow diagram representing the selective ENUM query process in accordance with at least one embodiment of the present disclosure. At block 202 the caller 144 operates the user equipment 146 so as to initiate a multimedia call to the callee 124. As a result, the user equipment 146 transmits a SIP INVITE request or other session request to the CSCF component 114 via the gateway 140 (assuming, in this example, that the callee 124 is in a separate network than the caller 144). In response, the P-CSCF component 121 obtains an identifier associated with the caller 144, such as the value stored in the P-Preferred-Identity or the P-Asserted-Identify fields (as defined by RFC 3325) in the SIP INVITE request, and uses this information to verify that the session request is received within an already established security association with the user equipment. If unverified, the P-CSCF component 121 ignores the session request. For the following, it is assumed that the session request is received within an already established security association.

At block 204, the P-CSCF component 121 determines whether the session request originated in a trusted network. The operator of the IP network 102 can maintain a list of trusted networks and an identifier of the originating network of the session request can be compared to this list. In another embodiment, rather than individually determine whether certain networks are trusted or not trusted, the P-CSCF component 121 can treat the originating network of the session request as a trusted network only if it is the same network in which the callee 124 is located. That is, in one embodiment the P-CSCF component 121 identifies the session request as coming from a trusted network only when the caller 144 and the callee 124 are located in the same network.

If the session request originates in a trusted network, such as from the home network of the callee 124, at block 206, the P-CSCF will forward the session request to the S-CSCF 123 along with an indication that the session request originated in a trusted network. In response to this indication, the S-CSCF component 123 permits an ENUM query to obtain the SIP URI information for the callee 124, and permits a DNS query to obtain the IP address associated with the SIP URI information. In performing the ENUM query, the S-CSCF component 123 translates the ITU E.164 telephone number associated with the callee 124 and provided in the session request to a corresponding fully-qualified domain name (FQDN) in accordance with, for example, the RFC 3761 specification. To illustrate, an E.164 telephone number of +1-555-123-4567 for the callee 124 would be translated by reversing the numbers, separating them with dots, and appending the "e164.arpa" suffix to generate a corresponding FDQN of "7.6.5.4.3.2.1.5.5.5.1.e164.arpa." The resulting FDQN then is used by the DNS server 118 to access the corresponding name authority pointer (NAPTR) record from the ENUM database 132 in accordance with, for example, the RFC 3403 specification. The NAPTR record typically includes a number of SIP addresses or other URIs that reference various devices or services through which the callee 124 can be reached, such as a SIP address for multimedia messaging, a SIP address for VoIP calls, and the like. Upon a successful match, all of the URI information in the corresponding NAPTR record typically can be returned in response to the ENUM query, depending on the configuration of other parameters in the NAPTR records. However, as discussed below, the scope of the ENUM query can be limited based on security parameters set on behalf of the callee 124. Assuming the E.164 telephone number is found in the NAPTR record, the SIP URI corresponding to the associated service then is used for the DNS query to obtain the appropriate IP address. Otherwise, the S-CSCF component forwards the SIP INVITE message to the BGCF component for PSTN breakout.

At block 208, the session request is routed to the designated endpoint device of the callee 124 (that is, the user equipment 126) based on the IP address via the P-CSCF component so as to establish the requested communications session between the user equipment 146 of the caller 144 and the user equipment 126 of the callee 124 using any of a variety of conventional VoIP and SIP protocols or other multimedia communications session protocols.

Returning to block 204, in the event that the session request does not originate in a trusted network, the access to the private URI information of the callee 124 may be limited by the security configuration set on behalf of the callee 124. Accordingly, at block 210 the S-CSCF component 123 queries the HSS 112 to obtain the callee profile for the callee 124 from the subscriber database 128. The callee profile, in one embodiment, provides a security configuration for the callee 124 that details the permitted scope of ENUM queries to the NAPTR record for the callee based on various security parameters. The security configuration can include parameters associated with the caller 144, such as a parameter that specifically identifies the caller as a member of a group for which ENUM queries are permitted, or alternatively, prohibited. The security parameters also can include parameters associated with particular time spans, and which are specific to the caller 144 or general in application. To illustrate, the security configuration can identify one or more time spans during which communications sessions with the callee 124 are permitted or prohibited and the caller's ability to conduct a communications session with the callee thus depends on the correspondence between the one or more time spans and a time of origination of the session request. As another example, the security configuration may identify one or more service types (such as video-conferencing, instant messaging, and the like) as permitted or prohibited and the caller's ability to conduct a communications session with the callee thus depends on the service type of the communications session the caller is attempting to establish. Particular, non-limiting examples of the security parameters of the security configuration can include: prohibiting any calls on Saturday and Sunday; permitting calls from any caller between 7 AM and 7 PM from Monday through Friday; specifically permitting caller 144 to call at any time; specifically prohibiting caller 144 to call at any time; permitting caller 144 to call only using a video-based multimedia session service; prohibiting all callers from calling using a video-based multimedia session service; and combinations thereof. The security parameters also can be applied on a group level (such as a "friends and family" list) and thus the application of any particular security parameter to the caller 144 depends on whether the caller is listed in the corresponding group.

At block 212 the S-CSCF component 123 compares the circumstances pertaining to the session request to the security configuration implemented for the callee 124 to determine whether to allow the session request to proceed on the IP-based networks. In the event that the circumstances pertaining to the session request are consistent with the security configuration (that is, the security configuration permits disclosure of private URI information of the callee 124 to the caller 144 under the circumstances), at block 214 the S-CSCF component 123 permits an ENUM query to obtain the SIP URI information for the callee 124, and permits a DNS query to obtain the IP address associated with the resulting SIP URI information. In one embodiment, the security configuration may provide that the ENUM query results are to be filtered so that only the certain URI information for the callee 124 is returned. To illustrate, if the security configuration for the callee 124 provides that the caller 144 is permitted to initiate only video-based communications sessions based on the "ENUM Service" type in the ENUM NAPTR record (for example, the "E2U+videomsg:sip" URI), the S-CSCF component 123 or other component may filter the SIP information so as to only return the SIP URI of the callee 124 related to the callee's Video Message service and withhold other SIP URIs, such as the SIP URI for the callee's multimedia messaging service. Based on the IP address obtained from the DNS query, the session request is routed based on the IP address and otherwise processed at block 216 so as to establish the requested communications session between the user equipment 146 of the caller 144 and the user equipment 126 of the callee 124 using the appropriate protocol.

Returning to block 212, in the event that the circumstances pertaining to the session request are inconsistent with the security configuration (that is, the security configuration does not permit disclosure of the private URI information of the callee 124 to the caller 144 under the circumstances) at block 218 the S-CSCF component 123 denies any attempt to perform an ENUM query for the session request and routes the session request to the BGCF 116. In response, the BGCF 116 attempts to establish a communications session with the callee 124 via the PSTN 106 using the E.164 telephone number supplied in association with the session request.

Figure 3:
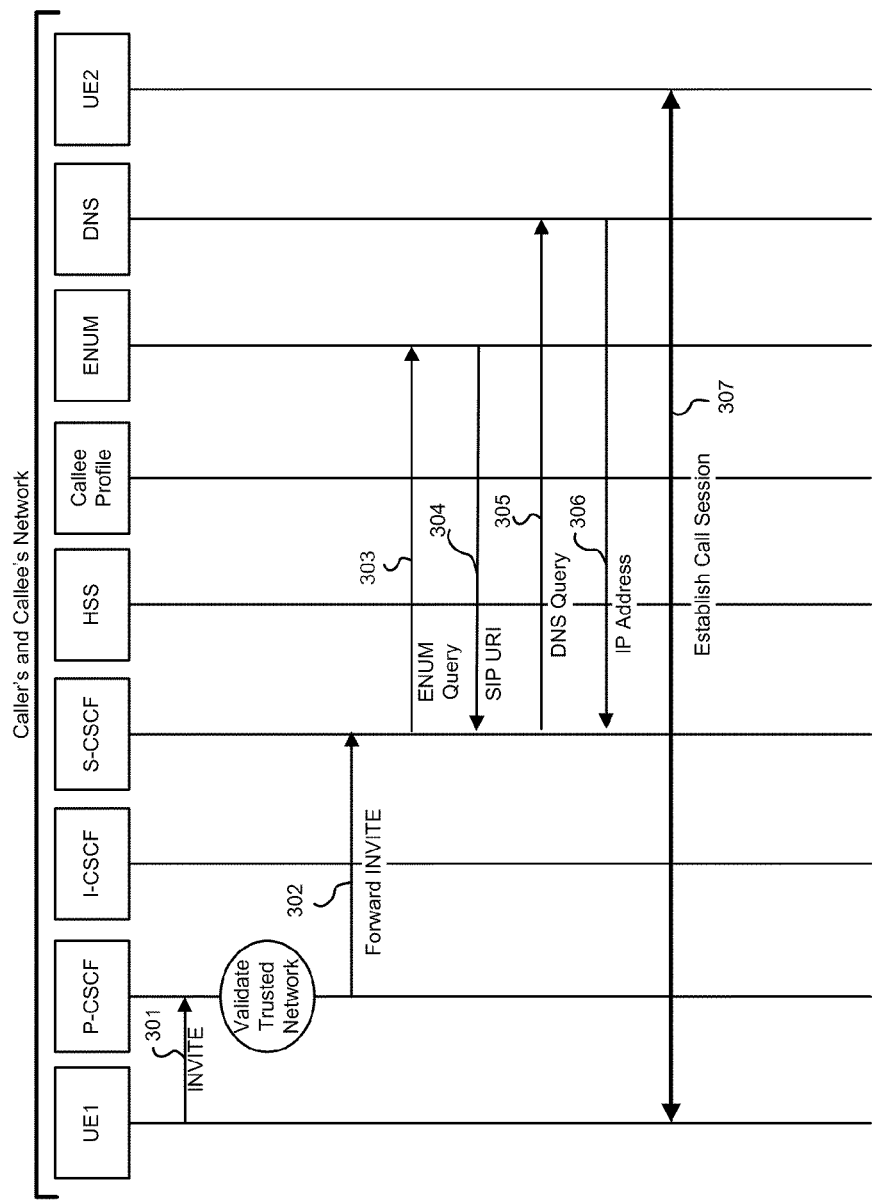
FIG. 3 is a diagram illustrating an example application of the method of FIG. 2 in the communications system of FIG. 1 in an instance whereby a caller is located within a trusted network.
Figure 4:
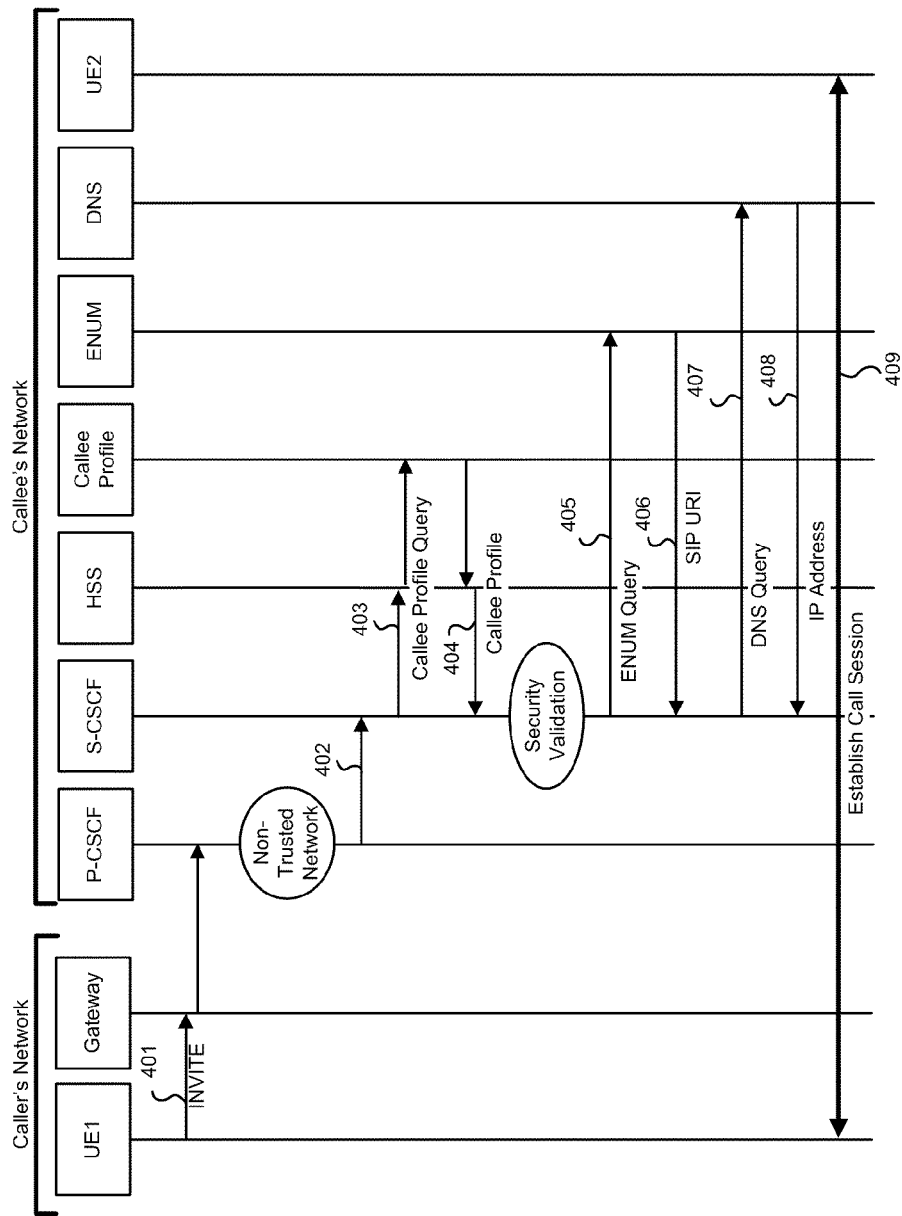
FIG. 4 is a diagram illustrating an example application of the method of FIG. 2 in the communications system of FIG. 1 in an instance whereby a caller is not located within a trusted network.
Figure 5:
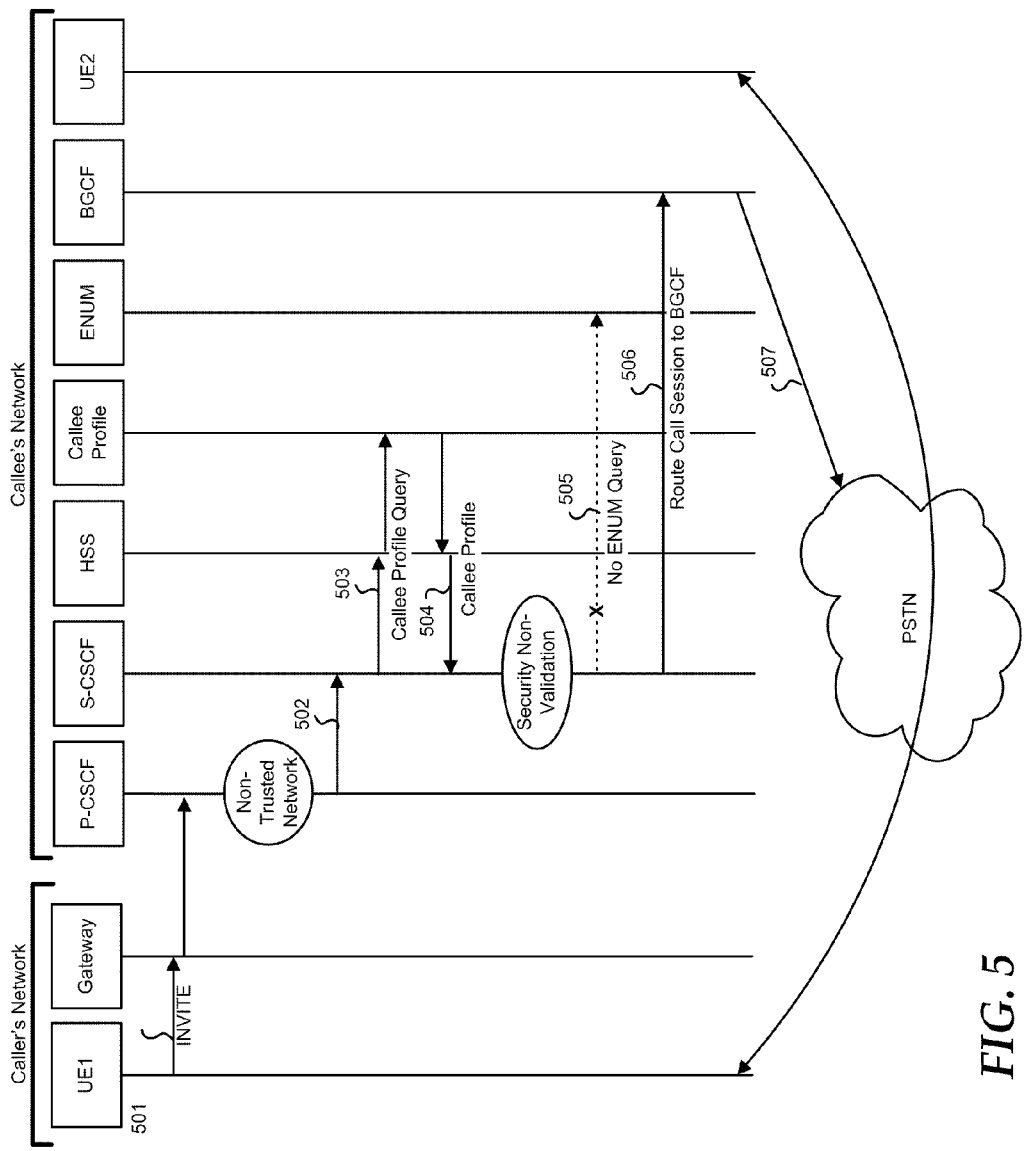
FIG. 5 is a diagram illustrating another example application of the method of FIG. 2 in the communications system of FIG. 1 in an instance whereby a caller is not located within a trusted network.

FIGS. 3-5 illustrate various examples of the operation of the communications system 100 in accordance with the method of FIG. 2. FIG. 3 illustrates an example whereby the caller 144 initiates the session request from a trusted network, such as an instance whereby the caller and the callee 124 are located in the same network. The caller 144 uses the caller's user equipment (UE1) to transmit a SIP INVITE request (line 301) to the P-CSCF component in the shared network. In response, the P-CSCF component accesses the P-Preferred-Identify field of the SIP INVITE request and, based on the information contained therein, identifies the SIP INVITE request as originating from a trusted network (that is, the same network as the callee in this example). Accordingly, the P-CSCF component forwards the SIP INVITE request to the S-CSCF component (S-CSCF1) in the shared network (line 302). The S-CSCF component initiates an ENUM query (line 303) to the ENUM server (such as the DNS server 118 in the example of FIG. 1) using the FQDN generated from the E.164 telephone number specified in the SIP INVITE request. The ENUM server accesses the corresponding NAPTR record and replies to the query with the SIP URI information (line 304) contained therein. The S-CSCF component then uses the SIP URI appropriate to the service type of the requested session to conduct a DNS query (line 305) to obtain the IP address of the I-CSCF component corresponding to the SIP URI. Using this IP address, the S-CSCF component forwards the SIP INVITE request (line 306) to the P-CSCF component, and then to the user equipment of the callee. The shared network then processes the SIP INVITE request to establish the requested communications session (line 307) between the caller 144 and the callee 124.

FIG. 4 illustrates an example whereby the caller 144 is not located in a trusted network and the circumstances pertaining to the session request are consistent with the security configuration of the callee 124. The caller 144 causes a SIP INVITE request (line 401) to be transmitted to the gateway of the caller's network, which then forwards the SIP INVITE request to the P-CSCF component of the callee's network. Based on the P-Preferred-Identity field of the SIP INVITE request, the P-CSCF component determines that the caller 144 is not located in a trusted network with respect to the callee 124. Accordingly, the P-CSCF component forwards the SIP INVITE request to the S-CSCF component along with an indication that the SIP INVITE request did not originate in a trusted network (line 402). In response, the S-CSCF component queries the HSS of the callee's network (line 403) to obtain the callee profile (line 404) for the callee 124. The S-CSCF component then uses the security configuration represented in the callee profile to determine that the caller 144 is permitted to initiate an IP network-based communications session with the callee 124. Accordingly, the S-CSCF component initiates (line 405) an ENUM query with the ENUM server of the callee's network. As described above, the ENUM query may be limited in scope in accordance with the security parameters set in place for the callee 124. The URI information (line 406) resulting from the ENUM query is used by the S-CSCF component to initiate a DNS query (line 407) to obtain the IP address (line 408) associated with the appropriate SIP URI. Using this IP address, the S-CSCF component processes the SIP INVITE request to establish the requested communications session (line 409) between the caller 144 and the callee 124.

FIG. 5 illustrates an example whereby the caller 144 is not located in a trusted network and the parameters pertaining to the session request are inconsistent with the security configuration of the callee 124. The caller 144 causes a SIP INVITE request (line 501) to be transmitted to the gateway of the caller's network, which then forwards the SIP INVITE request to the P-CSCF component of the callee's network. Based on the P-Preferred-Identity field of the SIP INVITE request, the P-CSCF component determines that the caller 144 is not located in a trusted network with respect to the callee 124. Accordingly, the P-CSCF component forwards the SIP INVITE request to the S-CSCF component along with an indication that the SIP INVITE request did not originate in a trusted network (line 502). In response, the S-CSCF component queries the HSS of the callee's network (line 503) to obtain the callee profile (line 504) for the callee 124. The S-CSCF component then uses the security configuration represented in the callee profile to determine that the caller 144 is prohibited from establishing an IP network-based communications session with the callee 124 (as illustrated by dotted line 505). Accordingly, the S-CSCF component routes (line 506) the SIP INVITE request to the BGCF component of the callee's network. In response, the BGCF component establishes the requested communications session (line 506) between the caller 144 and the callee 124 via the PSTN using the E.164 telephone number associated with the SIP INVITE request.

As illustrated by FIGS. 3-5, the techniques described herein take advantage of the reachability provided by the ENUM facility while also securing private URI information of subscribers from unscrupulous use by potentially malicious actors. In the event that the caller is located in a trusted network or the circumstances of the session request are consistent with a callee's security configuration, an ENUM query for the callee's URI information is permitted on behalf of the caller. In this instance, the ENUM facility is used to its full effect. However, in the event that the caller is not located in a trusted network and the circumstances of the session request are inconsistent with the callee's security configuration, no ENUM query is permitted, thereby securing the callee's URI information. By routing the session request to the PSTN in such cases, an opportunity remains for the caller to contact the callee, albeit in a manner that does not risk disclosure of private URI information.

Figure 6:
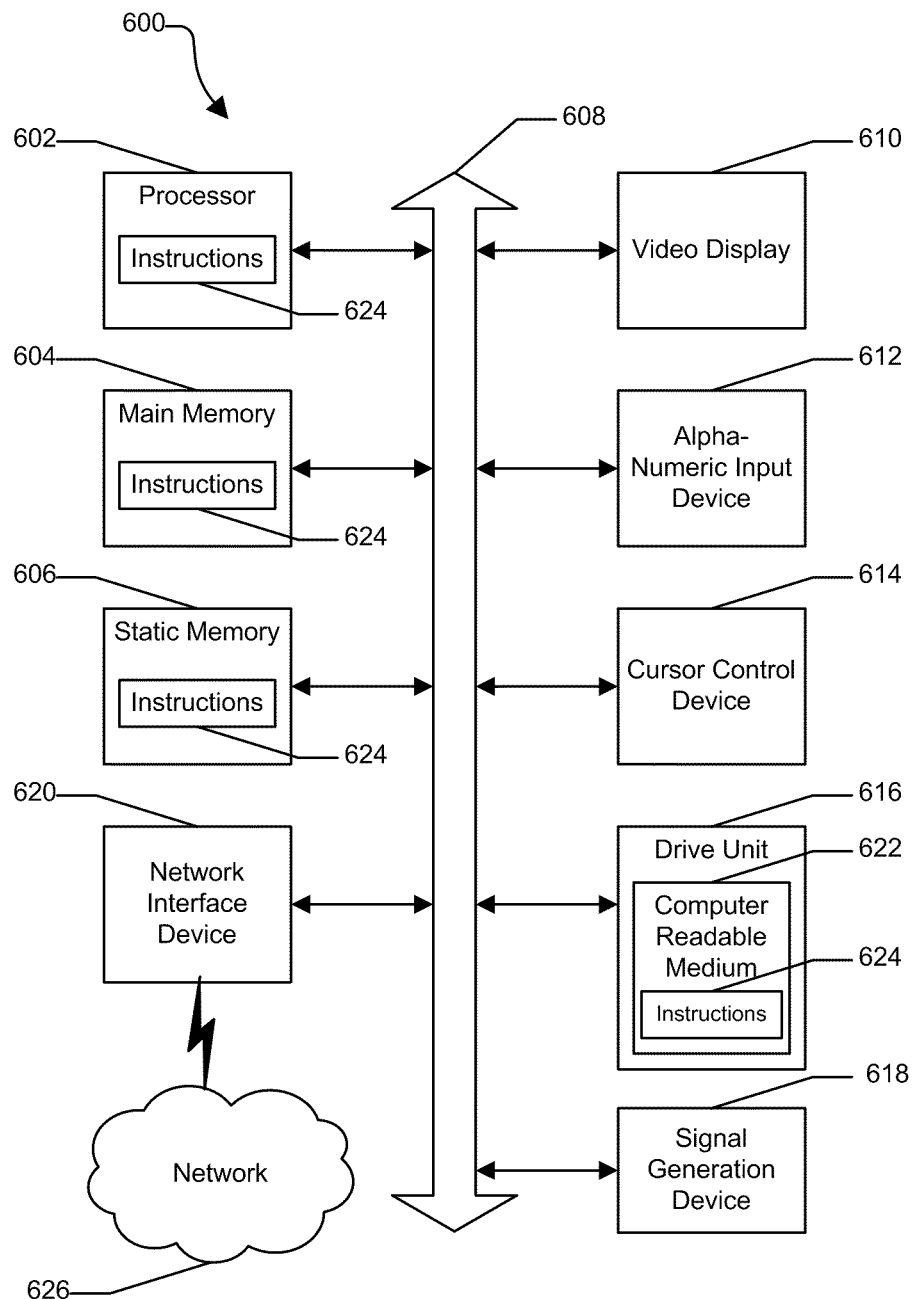
FIG. 6 is an illustrative embodiment of a computer system for implementing various techniques described herein in accordance with at least one embodiment of the present disclosure.

FIG. 6 shows an illustrative embodiment of a general computer system 600 in accordance with at least one embodiment of the present disclosure. The computer system 600 can include a set of instructions that can be executed to cause the computer system 600 to perform any one or more of the methods or computer-based functions described above. The computer system 600 may operate as a standalone device or may be connected via a network to other computer systems or peripheral devices.

In a networked deployment, the computer system may operate in the capacity of a server or as a client subscriber computer in a server-client subscriber network environment, or as a peer computer system in a peer-to-peer (or distributed) network environment. The computer system 600 can also be implemented as or incorporated into, for example, a STB device. In a particular embodiment, the computer system 600 can be implemented using electronic devices that provide voice, video or data communication. Further, while a single computer system 600 is illustrated, the term "system" shall also be taken to include any collection of systems or subsystems that individually or jointly execute a set, or multiple sets, of instructions to perform one or more computer functions.

The computer system 600 may include a processor 602, such as a central processing unit (CPU), a graphics processing unit (GPU), or both. Moreover, the computer system 600 can include a main memory 604 and a static memory 606 that can communicate with each other via a bus 608. As shown, the computer system 600 may further include a video display unit 610, such as a liquid crystal display (LCD), an organic light emitting diode (OLED), a flat panel display, a solid state display, or a cathode ray tube (CRT). Additionally, the computer system 600 may include an input device 612, such as a keyboard, and a cursor control device 614, such as a mouse. The computer system 600 can also include a disk drive unit 616, a signal generation device 618, such as a speaker or remote control, and a network interface device 620.

In a particular embodiment, as depicted in FIG. 6, the disk drive unit 616 may include a computer-readable medium 622 in which one or more sets of instructions 624, such as software, can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The main memory 604 and the processor 602 also may include computer-readable media. The network interface device 620 can provide connectivity to a network 626, such as a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal, so that a device connected to a network can communicate voice, video or data over the network 626. Further, the instructions 624 may be transmitted or received over the network 626 via the network interface device 620.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writeable memory. Additionally, the computer-readable medium can include a magneto-optical or optical medium, such as a disk or tapes or other storage device to capture carrier wave signals such as a signal communicated over a transmission medium. A digital file attachment to an email or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission such as TCP/IP, UDP/IP, HTML, and HTTP represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A method comprising:
   receiving, at a first network component of a packet-based network, a session request from a first subscriber, the session request comprising a request to establish a communications session between the first subscriber and a second subscriber via the packet-based network;
   determining, by utilizing a processor that executes instructions stored in memory, whether the session request originated in a trusted network; and
   in response to determining that the session request did not originate in the trusted network, selectively permitting access to unique resource identifier information associated with the second subscriber for use in establishing the communications session based on a security configuration in a profile associated with the second subscriber, wherein a scope of a query used in accessing the unique resource identifier information is limited based on the security configuration in the profile and is limited based on a type of the unique resource identifier information, and wherein the selectively permitting access to the unique resource identifier information is based on a security configuration identified time span during which communications sessions with the second subscriber are permitted and in response to a correspondence between the time span and a time of origination of the session request.

2. The method of claim 1, wherein selectively permitting access to unique resource identifier information further comprises:
   selectively permitting access to the unique resource identifier information based on a security configuration identified group of subscribers permitted to establish a communication session with the second subscriber and in response to determining whether the group includes the first subscriber.

3. The method of claim 1, wherein selectively permitting access to unique resource identifier information further comprises:
   selectively permitting access to the unique resource identifier information based on a security configuration identified permitted service type and in response to the service type of the communications session associated with the session request.

4. The method of claim 1, further comprising:
   permitting access to the unique resource identifier information via the first network component responsive to determining the session request originated in the trusted network.

5. The method of claim 1, wherein determining whether the session request originated in the trusted network comprises determining whether the session request originated in a network of the second subscriber.

6. The method of claim 1, further comprising:
   responsive to determining the first subscriber is not permitted to access the unique resource identifier information based on the security configuration, routing the session request to a second component of the packet-based network to establish the communications session via a public switched telephone network.

7. The method of claim 6, wherein:
   the first network comprises an internet protocol multimedia subsystem;
   the first network component comprises a communications session control function component; and
   the second component comprises a border gateway control function component.

8. The method of claim 1, wherein:
   the unique resource identifier information is stored at a server;
   the session request includes an E.164 telephone number associated with the second subscriber; and
   selectively permitting access to the unique resource identifier information via the first network component comprises selectively permitting the query to the server based on the E.164 telephone number.

9. A network component for implementation in a packet-based network, the network component comprising:
   a memory that stores instructions;
   a processor that executes the instructions to perform operations comprising:
      receiving a session request from a first subscriber, the session request comprising a request to establish a communications session between the first subscriber and a second subscriber via the packet-based network;

determining whether the session request originated in a trusted network; and in response to determining the session request did not originate in the trusted network, selectively permitting access to unique resource identifier information associated with the second subscriber for use in establishing the communications session based on a security configuration in a profile associated with the second subscriber, wherein a scope of a query used in accessing the unique resource identifier information is limited based on the security configuration in the profile and is limited based on a type of the unique resource identifier information, wherein the security configuration identifies a time span during which communications sessions with the second subscriber are permitted, and the network component selectively permits access to the unique resource identifier information responsive to a correspondence between time span and a time of origination of the session request.

10. The network component of claim 9, wherein:
the security configuration identifies a group of subscribers permitted to establish a communications session with the second subscriber; and
the network component selectively permits access to the unique resource identifier information responsive to determining whether the group includes the first subscriber.

11. The network component of claim 9, wherein:
the security configuration identifies a permitted service type; and
the network component selectively permits access to the unique resource identifier information responsive to the service type of the communications session associated with the session request.

12. The network component of claim 9, wherein the network component permits access to the unique resource identifier information responsive to determining the session request originated in the trusted network.

13. The network component of claim 12, wherein the network component determines whether the session request originated in the trusted network by determining whether the session request originated in a network of the second subscriber.

14. The network component of claim 13, further comprising a communications session control function component.

15. The network component of claim 9, wherein:
the unique resource identifier information is stored in association with a server;
the session request includes an E.164 telephone number associated with the second subscriber; and
the network component selectively permits access to the unique resource identifier information by selectively permitting the query to the server based on the E.164 telephone number.

16. A method comprising:
receiving, at a first network component of a packet-based network, a first session request from a first subscriber, the first session request comprising a request to establish a first communications session between the first subscriber and a second subscriber;

receiving, at the first network component, a second session request from a third subscriber, the second session request comprising a request to establish a second communications session between the third subscriber and the second subscriber;

permitting, by utilizing a processor that executes instructions stored in memory, access to unique resource identifier information associated with the second subscriber for use in establishing the first communications session in response to determining that the first subscriber is located in the same network as the second subscriber; and responsive to determining that the third subscriber is not located in the same network as the second subscriber:
accessing a security configuration from a profile associated with the second subscriber from a second network component of the packet-based network; and
selectively permitting access to the unique resource identifier information associated with the second subscriber for use in establishing the second communications session based on the security configuration, wherein a scope of a query used in accessing the unique resource identifier information is limited based on the security configuration from the profile and is limited based on a type of the unique resource identifier information, and wherein the selectively permitting access to the unique resource identifier information is based on a security configuration identified time span during which communications sessions with the second subscriber are permitted and in response to a correspondence between the time span and a time of origination of the session request.

17. The method of claim 16, wherein selectively permitting access to the unique resource identifier information comprises:

permitting access to the unique resource identifier information in response to determining access is permitted based on the security configuration; and denying access to the unique resource identifier information and initiating the second communications session via a public switched telephone network in response to determining access is prohibited based on the security configuration.

* * * * *